United States Patent
Chen et al.

(10) Patent No.: US 11,269,748 B2
(45) Date of Patent: Mar. 8, 2022

(54) DIAGNOSING AND MITIGATING MEMORY LEAK IN COMPUTING NODES

(71) Applicant: Microsoft Technology Licensing, LLC, Redmond, WA (US)

(72) Inventors: Cong Chen, Sammamish, WA (US); Xinsheng Yang, Sammamish, WA (US); Yingnong Dang, Sammamish, WA (US); Si Qin, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 16/855,949

(22) Filed: Apr. 22, 2020

(65) Prior Publication Data

US 2021/0334186 A1 Oct. 28, 2021

(51) Int. Cl.
*G06F 11/00* (2006.01)
*G06F 11/30* (2006.01)
(Continued)

(52) U.S. Cl.
CPC ...... *G06F 11/3037* (2013.01); *G06F 11/3447* (2013.01); *G06F 11/3452* (2013.01);
(Continued)

(58) Field of Classification Search
CPC ............. G06F 11/3037; G06F 11/3447; G06F 11/3452; G06F 11/3466; G06F 2201/81
See application file for complete search history.

(56) References Cited

U.S. PATENT DOCUMENTS

| 7,506,307 B2 * | 3/2009 | McCollum ......... G06F 11/0709 717/117 |
| 8,539,454 B2 * | 9/2013 | Havin ................. G06F 11/3624 717/130 |

(Continued)

FOREIGN PATENT DOCUMENTS

WO    WO-2018018575 A1 *  2/2018  .......... G06F 11/3452

OTHER PUBLICATIONS

"International Search Report and Written Opinion Issued in PCT Application No. PCT/US21/025695", dated Jul. 15, 2021, 14 Pages.

*Primary Examiner* — Elmira Mehrmanesh
(74) *Attorney, Agent, or Firm* — Ray Quinney & Nebeker P.C; James Bullough

(57) ABSTRACT

The present disclosure relates to systems, methods, and computer readable media for diagnosing and mitigating memory impact events, such as memory leaks, high memory usage, or other memory issues causing a host node from performing as expected on a cloud computing system. The systems described herein involve receiving locally generated memory usage data from a plurality of host nodes. The systems described herein may aggregate the memory usage data and determine a memory impact diagnosis based on a subset of the aggregated memory usage data. The systems described herein may further apply a mitigation model for mitigating the memory impact event. The systems described herein provide an end-to-end solution for diagnosing and mitigating a variety of memory issues using a dynamic and scalable system that reduces a negative impact of memory leaks and other memory issues on a cloud computing system.

17 Claims, 9 Drawing Sheets

(51) Int. Cl.
*G06F 11/34* (2006.01)
*G06F 12/02* (2006.01)
*H04L 67/10* (2022.01)

(52) U.S. Cl.
CPC ...... *G06F 11/3466* (2013.01); *G06F 12/0253* (2013.01); *H04L 67/10* (2013.01); *G06F 2201/81* (2013.01)

(56) References Cited

U.S. PATENT DOCUMENTS

| | | | | |
|---|---|---|---|---|
| 8,977,908 | B2* | 3/2015 | Qiu | G06F 11/076 714/47.1 |
| 9,104,563 | B2* | 8/2015 | Taskov | G06F 11/366 |
| 9,454,454 | B2* | 9/2016 | Abraham | G06F 11/3452 |
| 9,720,823 | B2* | 8/2017 | Urmanov | G06F 11/3423 |
| 10,333,798 | B2* | 6/2019 | Chan | G06F 16/285 |
| 2007/0136402 | A1* | 6/2007 | Grose | G06F 12/0253 |
| 2008/0250265 | A1 | 10/2008 | Chang et al. | |
| 2008/0301504 | A1* | 12/2008 | Chen | G06F 11/008 714/42 |
| 2012/0143795 | A1* | 6/2012 | Han | H04L 41/0636 706/12 |
| 2012/0216076 | A1* | 8/2012 | Macik | G06F 11/3612 714/38.1 |
| 2013/0145220 | A1* | 6/2013 | Lv | G06F 11/3065 714/47.1 |
| 2014/0067912 | A1* | 3/2014 | Vutukoori | G06F 11/0748 709/203 |
| 2015/0365309 | A1* | 12/2015 | Kaminski | H04L 43/0817 709/224 |
| 2016/0041848 | A1* | 2/2016 | Li | G06F 9/5055 718/104 |
| 2017/0308449 | A1* | 10/2017 | Mangione-Tran | G06F 12/00 |
| 2019/0129822 | A1* | 5/2019 | Alam | G06F 11/3037 |
| 2019/0213068 | A1* | 7/2019 | Upadhyay | G06F 11/3034 |

* cited by examiner

DIAGNOSING AND MITIGATING MEMORY LEAK IN COMPUTING NODES

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients or customers. These virtual services can be hosted by respective server nodes on a cloud computing system.

Recent years have seen rapid development in computing technology, particularly in the capabilities of server nodes on cloud computing systems. As a result, cloud computing infrastructures have grown in complexity and number of server devices. As the number of server devices has grown and as the number of services hosted by cloud computing systems continues to grow, processing capacity and processing defects (e.g., memory leak) continues to have a significant impact on performance of individual devices as well as cloud computing as a whole.

For example, memory leaks can significantly impact performance of server devices on a cloud computing system in a negative way. For instance, where memory leaks occur in an operating system (OS), virtual machines and other applications or services may suffer input/output (I/O) blips and pauses, loss of functionality and process crashes. In addition, deployment of virtual machines may fail as a result of insufficient memory capacity being available for new virtual machines.

Conventional memory management systems have attempted to mitigate memory defects in a number of ways with limited success. For example, many conventional systems attempt to detect memory leaks using static program analysis tools that can be applied on a large scale. Static program analysis tools, however, often fail to identify unique instances of memory leakage and cause significant disruption in the operation of those server nodes being analyzed. Other conventional systems have attempted to detect memory leaks during system execution by inserting extra statements into source code (e.g., to check for unreferenced memory blocks). These solutions, while often more accurate and less robust than static program analysis tools, are generally not scalable and require an individual deployment for each device on a cloud computing infrastructure.

These and other problems exist with regard to identifying and mitigating memory leak and other processing defect issues on networks of computing devices (e.g., server nodes of a cloud computing system).

DETAILED DESCRIPTION

Figure 1:
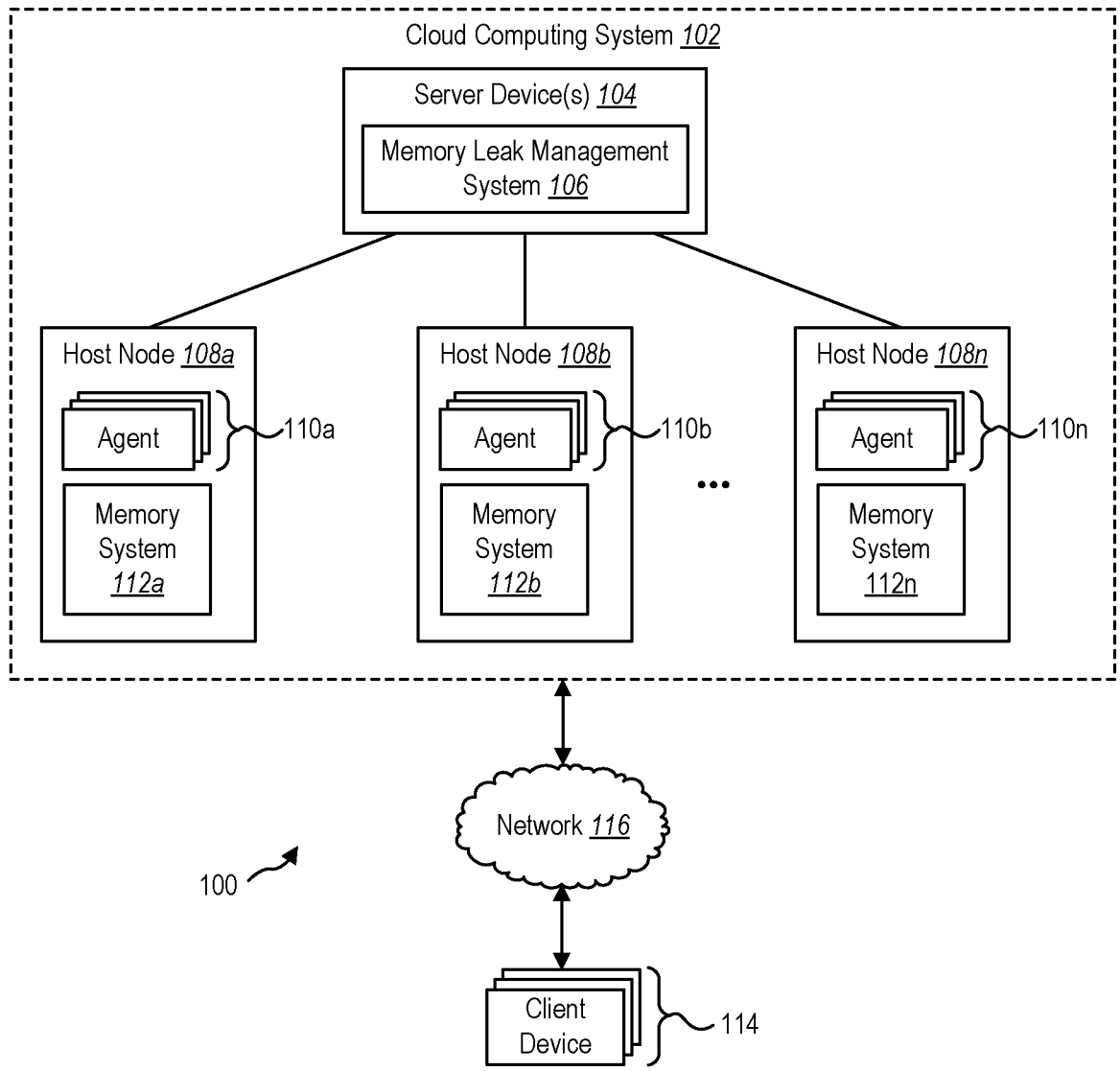
FIG. 1 illustrates an example environment of a cloud computing system including a memory leak management system in accordance with one or more implementations.

The present disclosure is generally related to a memory leak management system that provides an end-to-end solution for diagnosing and mitigating memory impact events, such as memory leaks, high memory usage, or other detected memory events that may be causing a host node on a cloud computing system from performing as expected. For example, as will be discussed in further detail below, the memory leak management system can implement a number of systems and services that implement a diagnosis workflow for identifying memory impact events, such as memory leaks on any number of a plurality of host nodes. Based on a diagnosed memory impact event (e.g., a memory leak), the memory leak management system can implement systems and services to identify and carry out an appropriate mitigation action predicted to solve or otherwise mitigate the memory impact event. In one or more embodiments, the memory leak management further generates an impact report and, in some cases, issues a rollout stop signal where an application or virtual machine rollout is causing memory leaks to occur on various host nodes.

For example, the memory leak management system can collect memory usage data (e.g., kernel mode data, user mode data, operating system data, application and processes data). The memory leak management system can additionally aggregate the memory usage data over various time intervals to diagnose a subset of nodes and/or processes on the respective nodes that are experiencing various memory events. The memory leak management system can utilize the diagnosis and aggregated memory usage data to determine a mitigation action to apply to one or more host nodes to prevent or otherwise reduce the negative impact of detected memory events.

As will be discussed in further detail below, the present disclosure includes a number of practical applications having features described herein that provide benefits and/or solve problems associated with diagnosing and mitigating memory leaks on select host nodes of a cloud computing system. Some example benefits are discussed herein in connection with various features and functionalities provided by the memory leak management system, particularly in connection with diagnosing and mitigating memory leaks. Nevertheless, it will be appreciated that benefits discussed in connection with one or more implementations are provided by way of example and are not intended to be a comprehensive list of all possible benefits of the memory leak management system.

As a first example, in one or more implementations, the memory leak management system reduces expense of processing resources by offloading acts of diagnosing and determining mitigation actions to perform on the respective host nodes. For example, the host nodes may selectively sample and provide memory usage data to the memory leak management system for analysis on another server device(s). Upon receiving the memory usage data locally generated by each of the host nodes, the memory leak management system can process the memory usage data to determine whether a memory leak has occurred as well as determine specifics about the memory leak on selective host nodes of the cloud computing system.

In addition to offloading processing resources from the host nodes having applications and services running thereon, the memory leak management system can additionally aggregate the memory usage data to improve accuracy with which memory leak issues are diagnosed as well as reduce the number of false positives identified with respect to various memory impact events. For example, as will be discussed in further detail below, the memory leak management system can aggregate memory usage data to identify and analyze trends of memory usage to determine specific types of memory impact events as well as severity of those events. Using this memory, the memory leak management system can selectively identify candidate nodes to further analyze in accurately diagnosing and mitigating memory impact events.

In one or more embodiments described herein, the memory leak management system can additionally implement an end-to-end solution for mitigating memory impact events while limiting impact of diagnosing and mitigating memory impact events. For example, by implementing a mitigation model, the memory leak management system can perform a variety of mitigation actions based on a minimal impact to the host node(s). For instance, rather than repaving any host node on which a memory leak is detected, the memory leak management system can instead perform a variety of less invasive mitigation actions (e.g., driver restart, service restart, process restart) in accordance with the mitigation model and limit performing more invasive mitigation actions (e.g., repaving a host node) to those cases in which the more invasive mitigation action is necessary.

As illustrated in the foregoing discussion, the present disclosure utilizes a variety of terms to described features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc.

As used herein, a "host node" refers to any computing device on a network of computing devices. For example, a host node may refer to any server device on a cloud computing system. A host node may include a memory system including memory hardware. The memory system may include memory allocated for an operating system as well as memory allocated for hosting virtual machines and other applications. In one or more embodiments described herein, the memory leak management system diagnoses and mitigates memory impact events specifically for the host operating system. For instance, one or more embodiments of the memory leak management system may diagnose and mitigate memory leaks exclusively on the operating system rather than on portions of the memory system allocated to user applications and/or virtual machines.

As used herein, a "memory impact event" may refer to an instance in which memory of the host node is impacted by a memory leak or other memory-related issue that has a negative impact on performance of a host node. For example, a memory impact event may refer to a memory leak, a high memory footprint for a particular OS or virtual machine, memory usage beyond a threshold memory usage budget, or other memory-related event. In one or more examples described herein, an operating system of a host node may experience a memory leak or other memory impact event.

As used herein, a "memory leak" may refer to an event or instance in which a portion of memory has been allocated or otherwise attributed to an application (e.g., an OS process or agent process) or driver, but where the component for which the portion of memory has been allocated does not necessarily use the portion of memory. As a result, the portion of memory may not be used by other applications and may cause a negative impact to performance of the host node. While one or more embodiments described herein may refer specifically to memory leaks, features and functionality described in connection with memory leaks may similarly apply to memory impact events.

As will be discussed in further detail herein, the memory leak management system can diagnose a memory leak based on memory usage data. As used herein, "memory usage data" may refer to any information associated with portions of memory committed to an application or process. For example, memory usage data may refer to system data, referring to any usage data allocated to an operating system of a host node. In addition, memory usage data may refer to user data, referring to any usage data allocated to virtual machines or other applications other than the operating system. As will be discussed herein, memory usage data may refer to a variety of different types of memory usage data generated or otherwise sampled by various agents on respective host systems.

Additional detail will now be provided regarding a memory leak management system in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 includes one or more server device(s) 104 having a memory leak management system 106 implemented thereon.

As further shown, the cloud computing system 102 includes any number of host nodes 108a-n. Each of the host nodes 108a-n may include agents 110a-n and memory systems 112a-n. For example, a first host node 108a may include any number of agents 110a and a respective memory system 112a. Similarly, a second host node 108b may include agents 110b and a memory system 112b having similar features and functionality as the agents 110a and memory system 112a on the first host node 108a.

The host nodes 108a-n may refer to any computing node on the cloud computing system 102 having a combination of hardware and software for providing services of the cloud computing system 102. In one or more embodiments, a host node 108a refers to a server device having an operating system thereon and one or multiple applications and/or virtual machines hosted thereon. The host nodes 108a-n may provide a number of storage and compute services. In addition, the host nodes 108a-n may refer to computing nodes on the same or across different datacenters. For example, the host nodes 108a-n may refer to nodes on the same server rack or across multiple racks on the same datacenter. In addition, or as an alternative, the host nodes 108a-n may refer to any number of computing nodes across multiple server racks and on different data centers. Indeed, the host nodes 108a-n may refer to any organization of computing nodes in communication with the memory leak management system 106 on the server device(s) 104.

As mentioned above, each of the host nodes 108a-n may include a number of agents 110a-n thereon. For example, the first host node 108a may include various agents 108a-n each configured to generate or sample different types of telemetry data. The set of agents 110a may include a monitoring agent that collects process related performance counters (e.g., memory usage data for particular processes) and other user mode memory usage data. The set of agents 110a may further include a pool monitoring agent that collects kernel mode memory usage data. The agents 110a may collect memory usage data by way of memory counters, pool tags, or other data collection technique for sampling telemetry data associated with usage of memory at a particular point in time on the corresponding host node 108a. Additional agents 108b-n on other host nodes 108b-n may include similar types of agents for collecting various types of memory usage data on the additional host nodes 108b-n. Additional information in connection with various types of agents will be discussed below in connection with FIG. 4.

As further shown in FIG. 1, the host nodes 108a-n include respective memory systems 112a-n thereon. The memory systems 112a-n may include any hardware, software, or other components of the host nodes 108a-n that influence memory usage on the respective nodes 108a-n. For example, a first memory system 112a on the first host node 108a may include various drivers (e.g., user-mode drivers, kernel-mode drivers, file system drivers), operating system (OS) programs, OS kernels, application program interfaces (APIs), applications, routines, or any component that affects the memory usage and memory capacity on the host node 108a. The other host nodes 108b-n may include memory systems 112b-n having similar features and functionality as the memory system 112a on the first host node 108a.

As further shown, the environment 100 includes client devices 114 in communication with the cloud computing system 102. The client devices 114 may refer to various types of client devices capable of accessing data on the cloud computing system 102. For instance, a client device may refer to a mobile device such as a mobile telephone, a smart phone, a personal digital assistant (PDA), a tablet, a laptop, or wearable computing device (e.g., a headset or smartwatch). A client device may also refer to a non-mobile device such as a desktop computer, a server node (e.g., from another cloud computing system), or other non-portable device. The client devices 114, server device(s) 104, and host nodes 108a-n may include additional features and functionality as generally discussed below in connection with FIG. 7.

The client devices 114 may communicate with devices of the cloud computing system 102 via a network 116. The network 116 may include one or multiple networks that use one or more communication platforms or technologies for transmitting data. For example, the network 116 may include the Internet or other data link that enables transport of electronic data between respective client devices 114 and components (e.g., server device(s) 104, host nodes 108a-b, virtual machines, or any other components of the cloud computing system 102.

Figure 2:
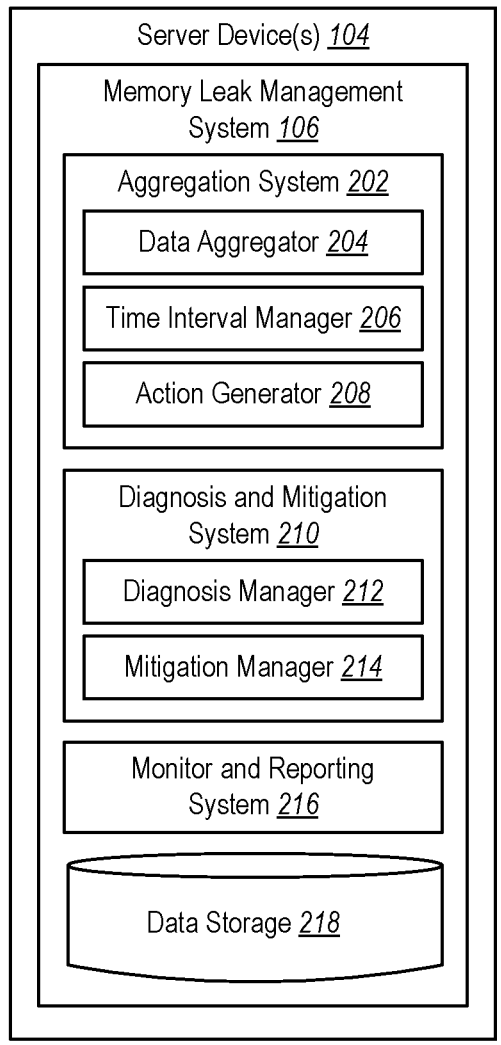
FIG. 2 illustrates an example implementation of the memory leak management system in accordance with one or more implementations.

Additional detail will now be provided regarding the memory leak management system 106 in accordance with one or more embodiments herein. For example, as shown in FIG. 2, the memory leak management system 106 is implemented on one or more storage device(s) 104. As further shown, the memory leak management system 106 may include an aggregation system 202. The aggregation system 202 may include a data aggregator 204, a time interval manager 206, and an action generator 208. In connection with diagnosing a memory leak (or other memory impact event), the aggregation system 202 may collect and aggregate memory usage data locally collected, generated, or otherwise sampled by a plurality of host node. Further, in connection with mitigating a diagnosed or detected memory leak, the aggregation system 202 may aggregate additional memory usage data and determine a migration action to perform to stop or otherwise mitigate the memory leak. Additional detail in connection with components 204-208 of the aggregation system 202 will be discussed below in connection with FIGS. 3A-4.

As further shown, the memory leak management system 106 may include a diagnosis and mitigation system 210. The diagnosis and mitigation system 210 may include a diagnosis manager 212 and a mitigation manager 214. In connection with diagnosing a memory leak (or other memory impact event), the diagnosis and mitigation system 210 can determine a subset of host nodes and/or processes for which the memory leak applies. The diagnosis and mitigation system 210 can additionally generate a diagnosis command for instructing host nodes to collect and/or share additional memory usage data. In connection with mitigating a memory leak or other memory impact event, the diagnosis and mitigation system 210 can additionally apply a memory mitigation model for accurately determining the nature of the detected memory leak. The diagnosis and mitigation system 210 may further generate a mitigation command to enable the host node(s) to mitigate an impact of the memory leak. Additional detail in connection with components 212-214 of the diagnosis and mitigation system 210 will be discussed below in connection with FIGS. 3A-4.

As further shown, the memory leak management system 106 may include a monitor and reporting system 216. The monitor and reporting system 216 may receive memory usage data and provide further analysis in connection with diagnosing and mitigating memory leaks on host nodes. For example, the monitor and reporting system 216 can utilize third-party analysis systems to perform a more thorough analysis of diagnosis information and/or memory usage information to develop a detailed report including information associated with specific host nodes and/or processes that may be used in preventing or otherwise mitigating memory impact events across nodes of the cloud computing system. Additional information in connection with the monitor and reporting system 216 and associated components will be discussed below in connection with FIGS. 3A-4.

As further shown in FIG. 2, the memory leak management system 106 may include a data storage 218. The data storage 218 may include any information associated with respective host nodes and/or processes and services hosted by the respective host nodes. In addition to information about the host nodes and processes thereon, the data storage 218 may include information about various models (e.g., diagnosis models, mitigation models) used by various components 202-216 of the memory leak management system 106 in performing features and functionalities described herein.

FIG. 2 illustrates an example implementation in which the components 202-216 are located on a single memory leak management system 106 on one or more shared server device(s) 104. Nevertheless, it will be understood that one or more of the components 202-216 or subcomponents may be located on the same or different server devices. For example, in one or more embodiments, the aggregation system 202 and associated sub-components 204-208 are implemented on a first server device (or multiple server devices) while the diagnosis and mitigation system 210 and associated sub-components 212-214 are implemented on a second server device (or multiple server devices). Further, the monitor and reporting system 216 may be implemented on a third server device (or multiple server devices). In addition, while each of the components 202-216 may be implemented on the same or different server devices on the same cloud computing system, in one or more implementations, one or more of the components 202-216 may be implemented across different cloud computing infrastructures.

Figure 3A:
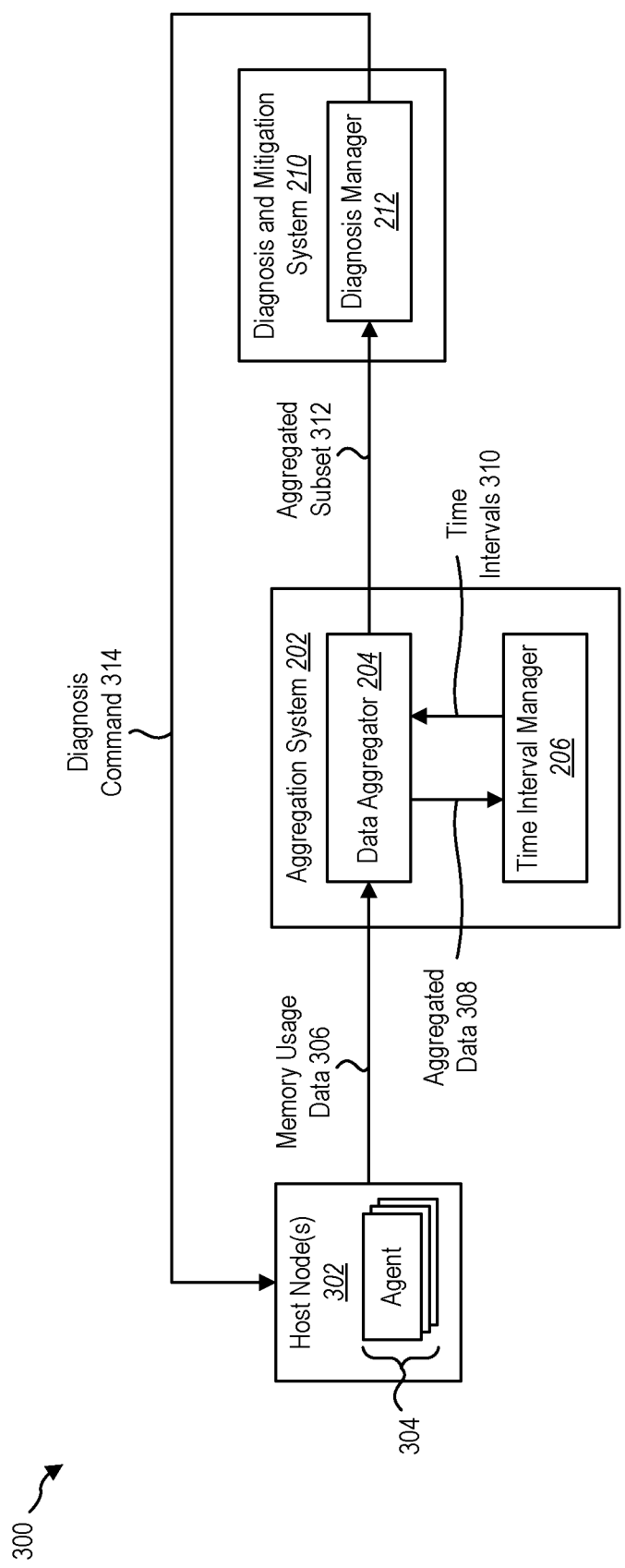
FIG. 3A illustrates an example workflow for diagnosing a memory leak in accordance with one or more implementations.

FIG. 3A illustrates an example workflow 300 associated with analyzing memory usage data and diagnosing one or more memory leaks. As illustrates in FIG. 3A, a plurality of host nodes 302 having agents 304 thereon may locally generate or sample memory usage data for the plurality of host nodes 302. The host nodes 302 and agents 304 may have similar features and functionality as the host nodes 108a-n and agents 110a-n discussed above in connection with FIG. 1.

For example, the agents 304 may refer to different types of agents that locally generate or sample a state of memory usage on the host node 302 and provide memory usage data 306 to the memory leak management system 106 (e.g., aggregation system 202) for further analysis. As mentioned above, the agents 304 may refer to multiple types of agents that track or otherwise monitor different types of memory usage statistics. As an example, the agents 304 may include a monitoring agent that collects process related performance counters associated with specific processes. The agents 304 may further include a pool monitoring agent that tracks pool tags indicating memory blocks allocated to various applications or processes. Different agents 304 may monitor memory usage related to memory cells that are in current use by different processes. In addition, the agents 304 may monitor memory usage related to allocation of memory cells even where those memory cells are not currently in use by different processes.

The memory usage data 306 may refer to various types of information indicative of memory usage on the host nodes 302. For example, the memory usage data 306 may include performance counters indicative of memory usage for specific processes. The memory usage data 306 may refer to kernel memory allocated by a kernel itself or kernel drivers. The memory usage data 306 may refer to pool tags or other memory blocks used by any application, virtual machine, or elements of an OS running on a corresponding host node 302. The memory usage data 306 may further include an identification of virtual machines, applications, or elements of an OS associated with the memory usage data. For example, in addition to a performance counters or pool tags, the memory usage data 306 may include an identification a process or application associated with the corresponding counters and tags.

One or more of the agents 304 may sample or otherwise generate memory usage data 306 at predetermined intervals of time. For example, the agents 304 may generate memory usage data 306 at fixed intervals and various frequencies (e.g., every minute, every five minutes, every hour). In one or more embodiments described herein, the agents 304 may obtain or capture snapshots of memory usage at points in time representative of allocation of memory blocks at the specific points in time. For instance, in one or more implementations, the agents 304 may capture a current status of memory allocation at five-minute intervals.

As shown in FIG. 3A, the host nodes 302 can provide the memory usage data 306 to the aggregation system 202 (e.g., the data aggregator 204). In one or more embodiments, the host nodes 302 provide the memory usage data 306 as the memory usage data 306 is generated by the agents 304. Alternatively, in one or more embodiments, the host nodes 302 provide batches of memory usage data 306 including multiple samples of data taken at multiple instances of the predetermined time interval.

Upon receiving the memory usage data 306, the data aggregator 204 may aggregate the data received from the host nodes 302. In one or more embodiments, the data aggregator 204 aggregates the data based on an interval in which the data was captured. For example, in one or more implementations, the data aggregator 204 aggregates the memory usage data 306 into hourly groups representative of all memory usage data 306 for one or more of the host nodes 302 captured during the representative hour of time. In one or more embodiments, the data aggregator 204 aggregates the memory usage data 306 into multiple time groupings such as hourly groupings, daily groupings, weekly groupings, monthly groupings, etc.

By aggregating the memory usage data 306 based on different groupings of time, the data aggregator 204 can observe trends of the memory usage data 306 over time and consider different trends of memory usage data 306 that may be meaningful for different time increments. For example, the data aggregator 204 can observe memory usage trends at different times of day or on different days of the week. In this way, the data aggregator 204 can reduce the number of falsely identified instances of memory leaks by determining that memory usage increases at different times of the day and/or on different days of the week. By aggregating the memory usage data in this way, the data aggregator 204 can additionally observe long term trends to more accurately identify various memory impact events that are associated with different types of trends. This analysis of trends may additionally enable the memory leak management system 106 to distinguish between memory impact events such as memory leaks or increased memory use over time.

In addition to aggregating the memory usage data 306 with respect to time intervals generally, the data aggregator 204 can additionally aggregate the memory usage data 306 into respective groupings based on the different sources of the memory usage data 306. For example, the data aggregator 204 can aggregate the memory usage data 306 into time series for each host node and for each process on the host node(s). As a result, the data aggregator 204 may generate aggregated data 308 including any number of time series showing trends of memory usage data 306 for groupings of time and for respective host nodes and processes. Indeed, the resulting aggregated data 308 may include hundreds of groupings of data for each of the host nodes 302.

As shown in FIG. 3A, the data aggregator 204 can provide aggregated data 308 to a time interval manager 206 to identify time intervals for the memory usage data 306. The time interval manager 206 may identify subsets of the memory usage data 306 based on observed trends of the aggregated data 308 over time. For example, the time interval manager 206 can evaluate a grouping of data (e.g., an aggregated chunk of data) to determine a relevant time interval for determining whether a memory leak exists as well as a severity of the memory leak.

In one or more embodiments, the time interval manager 206 iteratively determine a time interval based on the aggregated data 308 received over time. For example, and as will discussed in further detail below in connection with FIGS. 5A-5C, the time interval manager 206 may initiate a given time interval determination by designating a timestamp as an initial time stamp for the given time interval. As memory usage data 306 is aggregated and as current aggregated data 308 is received by the time interval manager 206, the time interval manager 206 can determine whether memory usage is trending up or down over time. Based on memory usage thresholds and tracked increases or decreases over time, the time interval manager 206 can maintain the initial time stamp or modify the relevant time interval by changing the initial time stamp based on the current aggregated data 308. Additional information in connection with identifying relevant time intervals for a given host node or specific process is discussed in further detail below in connection with FIGS. 5A-5C.

By identifying a relevant time interval and updating the relevant time interval as memory usage data is observed, the time interval manager 206 can accurately reduce the processing expense of one or more server devices on the cloud computing system 102 in accordance with one or more embodiments. In particular, by identifying subsets of data corresponding to relevant intervals for a subset of host nodes 302 and for a subset of processes on the various host nodes, the time interval manager 206 can significantly reduce the amount of processing needed to accurately diagnose memory leaks on a subset of the host nodes 302.

In one or more embodiments, the data aggregator 204 and time interval manager 206 collectively determine severity scores for the host nodes 302 and/or specific processes or applications on the host nodes 302. For example, in one or more implementations, the data aggregator 204 applies an algorithm to the aggregated memory usage data to determine a dynamic severity score corresponding to a current status of the memory usage data. Over time, as the severity score increases, the data aggregator 204 may determine that the aggregated memory usage data results in a severity score over a threshold value and determine that a memory leak or other memory impact event exists for a host node and/or process. In one or more embodiments, the data aggregator 204 provides the aggregated subset 312 (and the associated severity score) to the diagnosis and mitigation system 210 based on the severity score exceeding the threshold value.

As shown in FIG. 3A, the time interval manager 206 can provide an indication of the time interval(s) 310 to the data aggregator 204. The data aggregator 204 can provide an aggregated subset 312 to the diagnosis and mitigation system 210 for further analysis. For example, the data aggregator 204 can provide a subset of aggregated data 308 limited to memory usage data 306 for the identified time interval 310 to the diagnosis and mitigation system 210. In addition, in one or more implementations, the data aggregator 204 can provide an aggregated subset 312 including a subset of memory usage data corresponding to an identified subset of the host nodes 302 and/or processes of the subset of host nodes 302 to the diagnosis and mitigation system 210 for further analysis.

The aggregated subset 312 may be provided to the diagnosis and mitigation system 210 (e.g., a diagnosis manager 212) to diagnose one or more memory leaks on the host nodes 302. In particular, the diagnosis manager 212 can evaluate the aggregated subset 312 of memory usage data to determine a diagnosis command 314 including instructions for the host nodes associated with the aggregated subset 312 of memory usage data.

For example, the diagnosis manager 212 can determine a type of memory leak (or other memory impact event) based on the aggregated subset 312 of data. Based on the determined type of memory leak, the diagnosis manager 212 can identify a diagnosis action from a plurality of possible diagnosis actions. For instance, based on the aggregated subset 312 of memory usage data, the diagnosis manager 212 can identify one or more of a kernel dump (e.g., for a kernel leak), a process dump (e.g., for a process leak), a dynamic trace (DTrace) command for troubleshooting kernel and/or application problems, a head snapshot command for user-mode leaking, a virtual allocation command, a pool allocation command, a radar tool command, or other type of diagnosis command that may be performed on a respective host node.

As shown in FIG. 3A, after determining one or more diagnosis actions, the diagnosis manager 212 can provide a diagnosis command 314 to one or more host nodes of the set of host nodes 302. In particular, the diagnosis manager 212 can provide one or more diagnosis commands 314 to a subset of the host nodes 302 on which memory leaks have been detected or predicted by the aggregation system 202 and diagnosis and mitigation system 210. As will be discussed in further detail below, providing the diagnosis command 314 to the subset of host nodes 302 may cause the subset of host nodes 302 to perform additional acts in connection with generating a diagnosis report and/or mitigating the detected memory leaks.

Figure 3B:
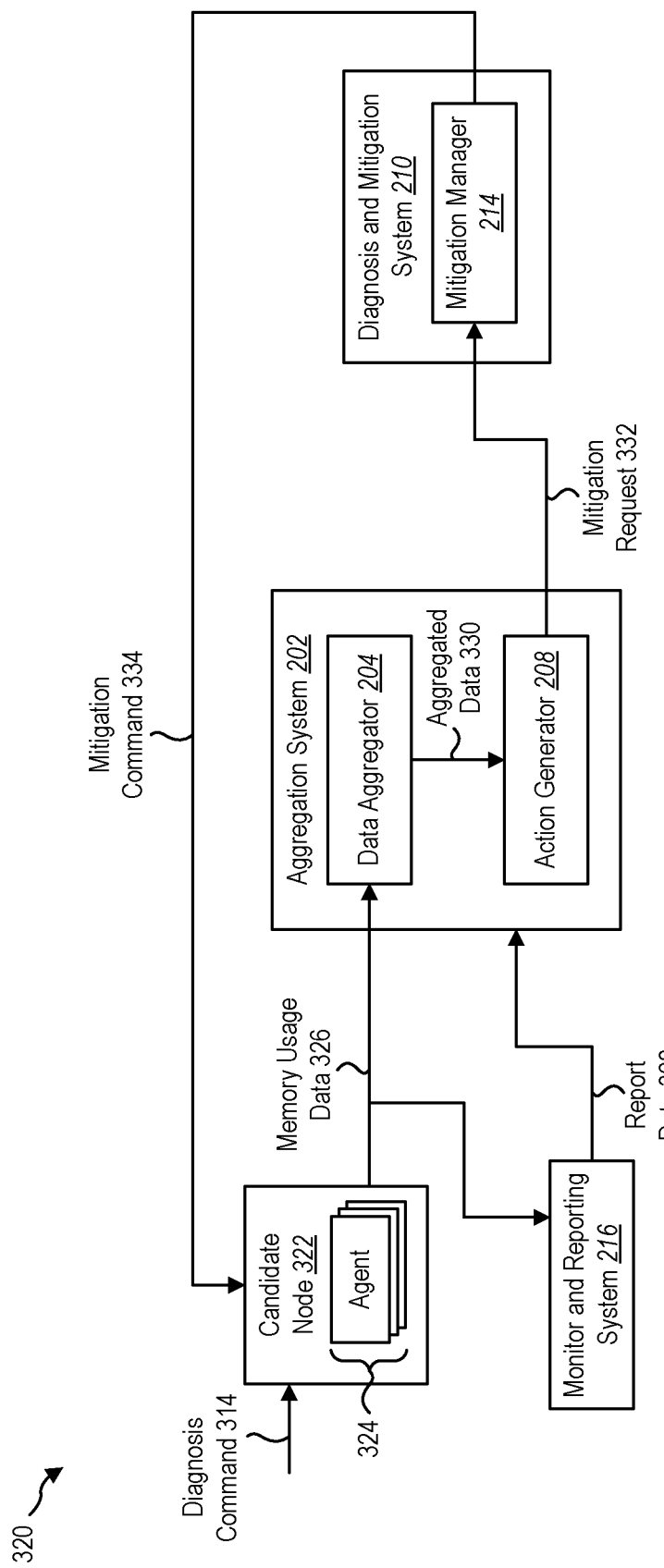
FIG. 3B illustrates an example workflow for mitigating a diagnosed memory leak in accordance with one or more implementations.

FIG. 3B illustrates an example workflow 320 associated with analyzing memory usage data and implementing one or more mitigation actions based on a detected memory leak (or other memory impact action). In particular, FIG. 3B illustrates a workflow 320 in connection with a candidate node 322 that receives the diagnosis command 314 from the diagnosis and mitigation system 210. As mentioned above, the diagnosis command 314 may include an indication of a memory leak or other memory impact event as well as instructions indicating one or more diagnosis actions that the candidate node 322 can perform to enable the memory leak management system 106 to effectively monitor further memory usage data and determine one or more mitigation actions that reduces a negative impact of the detected memory leak.

As shown in FIG. 3B, the candidate node 322 can receive the diagnosis command 314 from the diagnosis and mitigation system 210. In response to receiving the diagnosis command 314 (and based on information received in conjunction with the diagnosis command 314), agents 324 on the candidate node(s) 322 can collect additional memory usage data (or simply continue collecting memory usage data as discussed above in connection with FIG. 3A). In particular, each of multiple agents 324 can collect or sample different types of memory usage data. Similar to one or more embodiments described herein, the agents 324 can sample memory usage data at predetermined intervals (e.g., every five minutes).

In accordance with the instructions received via the diagnosis command 314, the candidate node 322 can provide memory usage data 326 to a monitor and reporting system 216. Additional host nodes may similarly provide memory usage data to the monitor and reporting system 216. In one or more embodiments, the monitor and reporting system 216 additionally receives aggregated data (e.g., aggregated data 330) from the aggregation system 202 containing data from all the host nodes (e.g., host node(s) 302).

The memory and reporting system 216 can analyze the memory usage data 316 to determine various reporting metrics associated with the detected memory leak. For example, the memory and reporting system 216 can determine reporting metrics including what information is leaking, a correlation between the memory leak and specific processes or application rollouts, rollout stacks and/or regions of memory affected by the memory leak, and other metrics helpful in more specifically determining a diagnosis of the memory leak and/or a mitigation action that can solve or otherwise reduce an impact of the memory leak.

In one or more embodiments, the memory and reporting system 216 generates report data 328 that may be used in determining one or more mitigation commands. For example, as shown in FIG. 3B, the candidate node 322 can provide memory usage data 326 to the aggregation system 202 in combination with report data 328 provided by the memory and reporting system 216. As shown in FIG. 3B, the aggregation system 202 (e.g., the data aggregator 204) can receive memory usage data 326 and generate aggregated data 330 in accordance with one or more embodiments described herein.

As further shown, the data aggregator 204 can provide the aggreged data 330 to an action generator 208 to determine one or more mitigation requests 332 to perform in response to the diagnosed memory leak. In one or more embodiments, the action generator 208 determines a mitigation request 332 based on a combination of the aggregated data 330 and the report data 228. As shown in FIG. 3B, the mitigation request 332 may be provided to the diagnosis and mitigation system 210 (e.g., the mitigation manager 214).

In one or more embodiments, the mitigation request 332 includes information about the memory leak that may be used in determining a mitigation action to perform by the candidate node 322 in response to the memory leak. For example, the mitigation request 332 may include an identification of the memory leak (e.g., an indication that the memory impact event is a memory leak or other type of memory impact event). The mitigation request 332 may additionally include an indication of a severity of the memory leak. The mitigation request 332 may further indicate an indication of the candidate node 322 and/or specific processes affected by the memory leak. The mitigation request 332 may include information about previous mitigation actions that have been performed on a respective candidate node. In one or more embodiments, the mitigation request 332 includes an identified or recommended mitigation action to perform on the candidate node 322.

As shown in FIG. 3B, the aggregation system 202 can provide the mitigation request 332 to the diagnosis and mitigation system 210 (e.g., the mitigation manager 214). Upon receiving the mitigation request 332, the mitigation manager 214 can apply a mitigation model to information contained within the mitigation request 332 to determine a specific mitigation action to perform on the candidate node 322. For example, in one or more embodiments, the mitigation manager 214 applies a decision tree to the mitigation request 332 by performing a series of decisions to determine the best or least invasive mitigation action that will reduce or eliminate a negative impact of the memory leak. For example, the mitigation manager 214 may apply a mitigation model to determine whether one or more mitigation actions such as repaving the candidate node, performing an OS reboot, restarting a process, restarting a driver, or other appropriate mitigation action based on the information included within the mitigation request 332. Additional information in connection with applying the mitigation model to determine a mitigation action is described below in connection with an example framework shown in FIG. 4.

As shown in FIG. 3B, the diagnosis and mitigation system 210 can generate a mitigation command 334 including instructions for mitigating the diagnosed memory leak. In particular, after determining a mitigation action to perform on the candidate node 322, the diagnosis and mitigation system 210 can provide a mitigation command 334 including instructions (e.g., executable instructions) to the candidate node 322. The candidate node 322 may then perform the mitigation action in accordance with the mitigation command 334 to reduce a negative impact of the memory leak.

In accordance with FIGS. 3A-3B, the memory leak management system 106 may continue receiving data collected by agents of a set of host nodes to diagnose memory leaks and generate mitigation commands that provide a non-invasive solution to address various memory leaks and other memory impact events. For example, after performing the mitigation action(s) in accordance with the mitigation command 334 shown in FIG. 3B, the candidate node 322 may continue providing memory usage data to the memory leak management system 106 in continuing to diagnose and mitigate memory leaks. Thus, in accordance with one or more embodiments described herein, the memory leak management system 106 can continue performing acts shown in workflows 300, 320 to dynamically diagnose and mitigate memory leaks.

In one or more embodiments, the memory leak management system 106 considers a history of diagnoses and mitigation actions performed in response to memory leaks and other memory impact events. For example, where the memory leak management system 106 has provided a threshold number of mitigation commands in response to one or more similar types of memory leaks or memory leaks potentially related to same issues, the memory leak management system 106 can elevate a mitigation response to a memory leak. For instance, where a mitigation action for a particular memory leak is to restart a process, the memory leak management system 106 may determine that an OS reboot is needed on a subsequent identification of a similar memory leak. In one or more embodiments, the memory leak management system 106 may continue escalating invasiveness of mitigation actions to eventually repave the candidate node 322 after performing various mitigation actions.

By performing recurring diagnosis and mitigation as discussed herein, the memory leak management system 106 can avoid or significantly reduce more invasive mitigation actions in response to detected memory leaks. For example, where a conventional system may normally repave host nodes as a comprehensive response to detected memory leaks based on limited information, the memory leak management system 106 may reduce the overall impact to a cloud computing system 102 as a result of repaving host nodes on a regular basis. Instead, the memory leak management system 106 can reduce a number of times that host nodes on a cloud computing system 102 are repaved.

In addition to reducing the impact of performing various mitigation actions, the memory leak management system 106 can reduce costs associated with host nodes going down for extended periods of time and waiting for manual mitigation steps. For example, where conventional systems often rely on maintenance individuals physically removing host nodes from server racks and either discarding or manually mitigating memory leak issues, the memory leak management system 106 significantly reduces costs associated with manual mitigation by dynamically diagnosing and mitigating memory leaks using the end-to-end implementations described herein.

Figure 4:
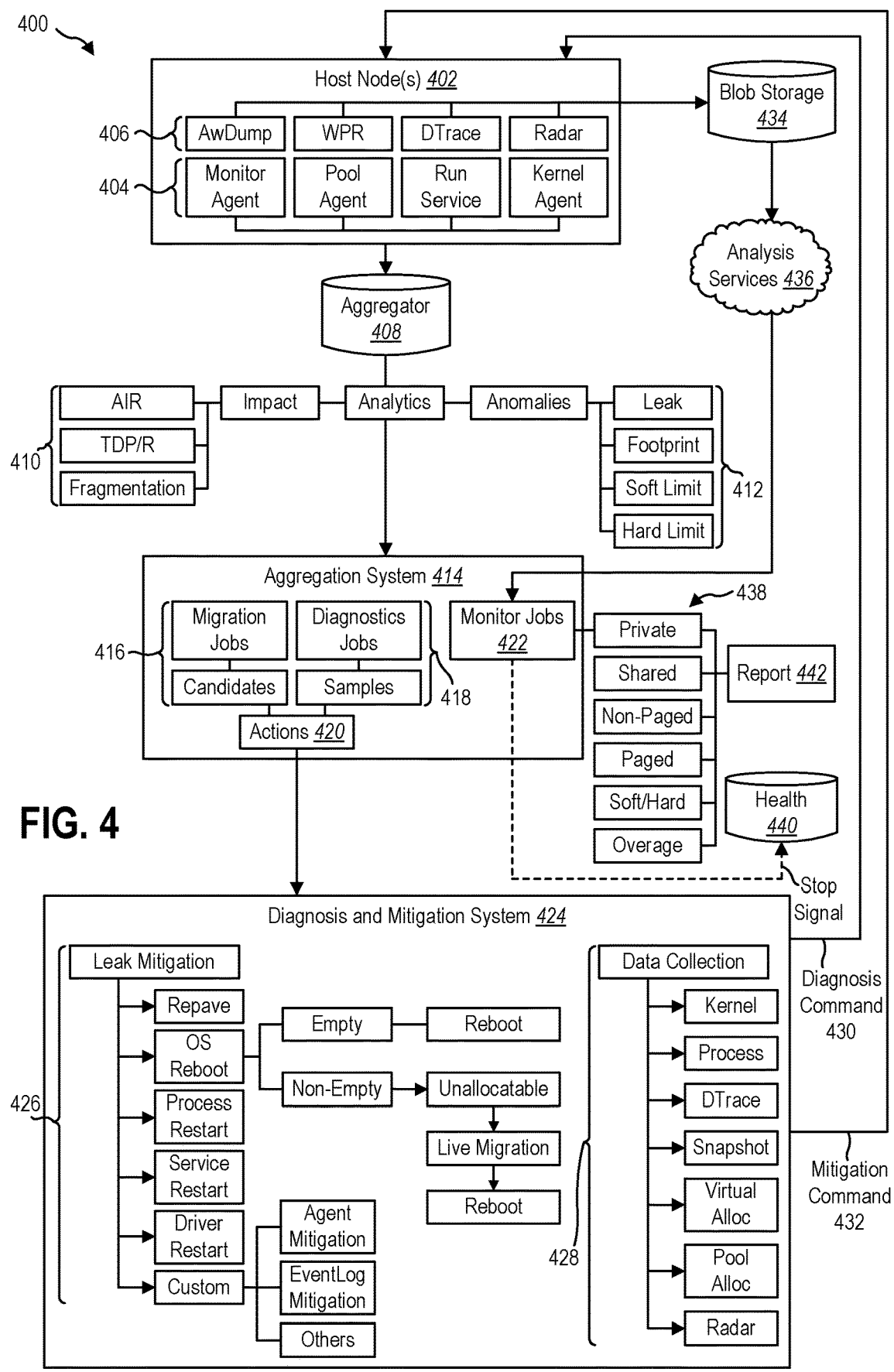
FIG. 4 illustrates a more detailed implementation of the memory leak management system in accordance with one or more implementations.

Further detail is now provided in connection with an example implementation of the memory leak management system 106 in accordance with one or more embodiments described herein. In particular, FIG. 4 illustrates an example workflow for diagnosing a memory impact event, reporting the memory impact event, and implementing a mitigation action to perform in response to the memory impact event. This workflow provides an example implementation in accordance with one or more implementations described herein. For instance, one or more of the features described in connection with FIG. 4 may similarly be implemented as a part of any of the above-described examples shown in FIGS. 1-3B.

FIG. 4 illustrates an example workflow 400 for diagnosing and mitigating a memory impact event in accordance with one or more embodiments. For example, FIG. 4 illustrates a host node 402 including a number of agents 404 and processes 406 thereon. In accordance with one or more embodiments, the agents 404 may provide memory usage data to an aggregation server 408. The aggregation server 408 may analyze various jobs to determine a variety of metrics. In one or more embodiments, the determines customer impact metrics 410 such as an AIR metric (e.g., reboot of a virtual machine), TDP/R (e.g., failure to start a new virtual machine), or a fragmentation metric (e.g., a fragmentation index of the memory blocks). In addition to the customer impact metrics 410, the aggregation server 408 may detect various anomalies 412 (e.g., memory impact events) such as memory leaks, high memory footprint, soft limit (e.g., a memory budget that triggers an alarm), or a hard limit (e.g., a memory budget that triggers a stop signal).

In one or more embodiments, the aggregation server 408 determines a severity score associated with a probability that a memory leak or other anomaly exists on a given host node and/or process. For example, the aggregation server 408 may apply a severity score algorithm to aggregated memory usage data to determine whether the memory usage data exceeds a threshold usage budget (e.g., a high or low threshold), or whether the memory usage data includes signals indicative of a particular type of memory leak. In one or more embodiments, the aggregation server 408 determines whether a calculated severity score exceeds a threshold value and, based on this determination, provide the aggregated memory usage data to the aggregation system 414.

In one or more embodiments, determining the different metrics involves aggregating the memory usage data in accordance with examples discussed above. This may include determining relevant time intervals and aggregating the memory usage data locally sampled by the host node 402 into buckets or groups of data for the relevant time interval. The aggregated data (and determined metrics) may be provided to the aggregation system 414.

In particular, as shown in FIG. 4, after determining the metrics, the memory leak management system 106 can provide data to an aggregation system 414 (e.g., similar to the aggregation system 202) for further aggregation and analysis of the memory usage data. For example, the aggregation system 414 can determine mitigation metrics 416 such as mitigation jobs (e.g., what mitigation job needs performed based on the impact metrics and/or anomalies) and candidate nodes on which mitigation should be performed. The aggregation system 414 can additionally determine diagnosis metrics 418 including diagnosis jobs (e.g., diagnosis actions that should take place) and sample nodes corresponding to host nodes from which additionally memory usage data should be collected.

In both the diagnosis and mitigation workflows, the aggregation system 414 can include an action component 420 (e.g., the action generator 208) for providing a request to the diagnosis and mitigation system 424 (e.g., similar to the diagnosis and mitigation system 210 discussed above). As shown in FIG. 4, the diagnosis and mitigation system 424 may include a mitigation model 426 including a decision tree (or other decision model) that guides the diagnosis and mitigation system 424 in identifying one or more mitigation actions to perform for a candidate node. As further shown, the diagnosis and mitigation system 424 includes a data collection model 428 including various diagnosis actions that may be performed based on memory usage data particular to the host node(s) 402.

In the example shown in FIG. 4, the mitigation model 426 includes an example decision tree based on detecting a memory leak. The mitigation model 426 may include additional acts or branches of a decision tree for other types of memory impact events (or the different anomalies listed above). In the example shown in FIG. 4, the diagnosis and mitigation system 424 may select a given mitigation action based on a mitigation request received from the action component 420. By way of example, the mitigation model 426 may include a first branch of repaving a node (e.g., where the memory leak is most severe). The mitigation model 426 may additionally include a second branch of performing an OS reboot. Where a candidate node is an empty node, the OS reboot may involve a reboot. For example, the OS reboot may involve rebooting a kernel without initializing hardware and/or where a state of virtual machine memory is preserved. Alternatively, where the candidate node is a non-empty node, the mitigation model 426 may include a branch or series of acts of making the node unallocatable (e.g., marking the node to stop allocation of virtual machines), live migrating virtual machines that can be migrated, then performing a reboot. It will be understood that while only the OS reboot includes subbranches, this is provided by example for illustrative purposes. Other branches of the mitigation model 426 may similarly include more detailed subbranches.

As further shown, the mitigation model 426 may include a process restart branch associated with restarting a process on a candidate node. The mitigation model 426 may further include a server restart branch for restarting a virtual machine or other cloud-based service. The mitigation model 426 may further include a driver restart for rebooting or otherwise restarting a driver. In one or more embodiments, the mitigation model 426 further includes custom actions such as agent migration, event log migration, or other actions that may be performed to mitigate a detected memory leak.

As mentioned above, and as shown in FIG. 4, the data collection model 428 may similarly include actions that may be included within a command provided to the host nodes. In particular, FIG. 4 illustrates an example data collection model 428 based on a detected memory leak (e.g., in accordance with a severity score and additional information). Other embodiments may include additional branches or actions to perform based on a corresponding type of memory impact event (or based on a diagnosis request received from the aggregation system 414).

As shown in FIG. 4, the data collection model 428 includes various acts based on different types of leaks. In particular, the data collection model 428 indicates different types of diagnosis actions that the host node(s) 402 may perform based on one or more detected leaks. In one or more implementations, the data collection model 428 indicates multiple diagnosis actions that should be performed in response to an identified memory leak. Thus, the data collection model 428 shown in FIG. 4 is a list of example diagnosis actions, any of which (or all of which) may be performed in response to identifying a memory leak on a host node.

For instance, the data collection model 428 may include a kernel dump for a kernel leak. The data collection model 428 can include a process dump for a process leak. The data collection model 428 can include a DTrace (e.g., a command for troubleshooting kernel and/or application problems), a heap snapshot (e.g., for user mode leaks), a virtual allocation, a pool allocation, and a radar (e.g., a tool to attach to a process to generate more detailed snapshots).

As shown in FIG. 4, the diagnosis and mitigation system 424 may loop commands back to the host node(s) (or a subset of host nodes) based on diagnosis and migration requests in addition to identified mitigation and/or diagnosis actions determined for the respective host nodes. For example, the diagnosis and mitigation system 424 can provide a diagnosis command 430 indicating one or more of the actions indicated within the data collection model 428 that should be performed on the host node(s) 402. As another example, the diagnosis and mitigation system 424 can provide a mitigation command 432 indicating one or more mitigation actions indicated within the mitigation model 426 that should be performed on the host node(s) 402.

In the example of the diagnosis command 430, the host node(s) 402 can perform diagnosis actions in accordance with instructions included within the diagnosis command 430. For example, the host node(s) 402 may invoke various processes 406 that involve providing data or implementing tools that extract and provide data to a blob storage 434 for further processing. The blob storage 434 may utilize one or more analysis service(s) 436 (e.g., third-party services) on the same or different cloud computing system as the cloud computing system 102 on which the memory leak management system 106 is implemented.

The analysis service(s) 436 can perform analysis on the data received from the host node(s) 402. For example, the analysis service(s) 436 can analyze the memory usage data and determine additional information about the memory leak and/or host node 402. For instance, the analysis service(s) 436 can look into the memory dump and determine what data has leaked, what memory blocks are affected, and other relevant information. In one or more implementations, the analysis service(s) 436 can additionally determine memory stacks affected by the memory leak. The analysis service(s) 436 can further provide historical data about a memory system including what memory usage data has changed over time.

As shown in FIG. 4, the analysis service(s) 436 can provide the additional information to a job monitor 422. The job monitor 422 can evaluate aggregated data and perform a variety of monitoring jobs 438 based on the aggregated data collected by the host node(s) 402 in addition to the additional information received from the analysis service(s) 436. For example, the job monitor 422 can identify monitoring jobs associated with monitoring private committed memory, shared committed memory, non-paged pools, and paged pools. The job monitor 422 can additionally monitor soft and hard limits of memory (e.g., memory budgets corresponding to different thresholds) and host overages (e.g., determining how much memory the host OS is using relative to how much is actually reserved).

The memory leak management system 106 can utilize the monitored data in a variety of ways. For example, as shown in FIG. 4, the job monitor 422 can generate a usage report 442 including information about customer impact, such as a rollout correlation metric (e.g., correlation between rollout of various applications and instances of memory leaks). For example, where an agent or OS is deployed to a cloud computing system 102 using multiple batches and using test clusters prior to ramping up deployment to all production clusters, the job monitor 422 (or other component of the memory leak management system 106) may determine a rollout correlation metric indicative of when the memory leak relative to a stage of the gradual rollout.

In one or more embodiments, the job monitor 422 may provide a rollout stop signal to a health server 440 to indicate that a particular application rollout has a problem and that the rollout should be stopped to any and all host nodes. For example, where a strong correlation metric is identified between an application or OS rollout and a detected memory leak, the job monitor 422 may issue a signal to deployment infrastructure of the cloud computing system 102 to stop further roll out to additional devices. This may trigger additional mitigation or a high severity ticket to a developer team to investigate and fix the issue. In one or more embodiments, the monitored data may be used as training data for one or more of the mitigation model 426 and/or diagnosis model 428 to fine-tune or otherwise improve upon the accuracy of diagnosing memory leaks as well as mitigating detected memory leaks.

In one or more embodiments described herein, the diagnosis and/or mitigation workflow is performed in response to or based on the presence of a rollout stop signal. For instance, where a rollout stop signal has been issued part way through a rollout resulting in one or more memory leaks, it may be likely that memory leaks are present on one or more host nodes and/or processes (e.g., host nodes and/or processes affected by earlier stages of the deployment rollout). Thus, in one or more embodiments, the memory leak management system 106 performs diagnosis and/or mitigation based on or in response to a rollout stop signal being issued.

As mentioned above, in one or more embodiments, the memory leak management system 106 aggregates memory usage data received from a plurality of host nodes and/or candidate nodes. As further discussed, the memory leak management system 106 can reduce processing expense by aggregating a subset of data corresponding to a time interval while discarding additional memory usage data outside of the identified time interval. By way of example, FIGS. 5A-5C illustrates an example in which the memory leak management system 106 determines a relevant time interval in accordance with one or more embodiments.

Figure 5A:
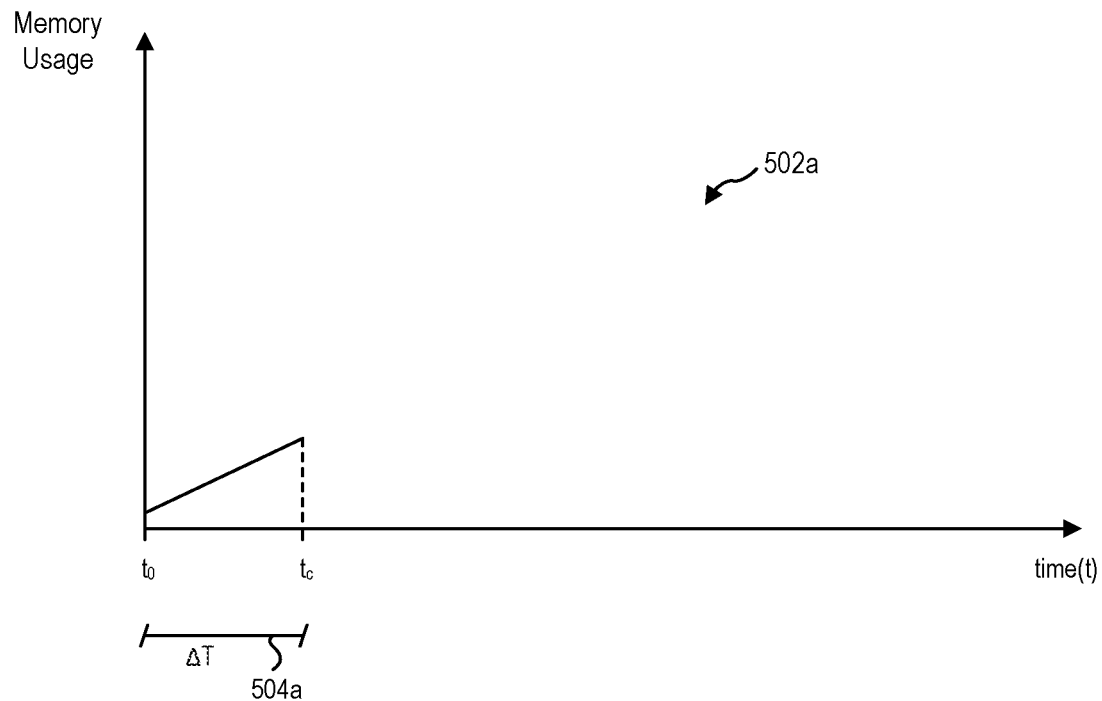
FIGS. 5A-5C illustrate an example implementation of determining and updating a relevant time interval when aggregating and analyzing memory usage data in accordance with one or more implementations.

For example, FIG. 5A illustrates a timeline 502a showing memory usage over time from an initial time stamp ($t_0$) to a current time stamp ($t_c$). As shown in FIG. 5A, the memory usage has increased over time. In this example, the memory leak management system 106 may determine that a memory leak (or other memory impact event) exists on a given host node based on increased memory usage over time (e.g., over a predetermined threshold of time) and/or based on a sharp increase in memory usage over a short period of time. Based on this correlation between increased memory usage and the presence of a memory leak, the memory leak management system 106 may determine that a current time interval (ΔT) 504a is a time interval extending from the initial time stamp ($t_0$) and the current time stamp ($t_c$).

Figure 5B:
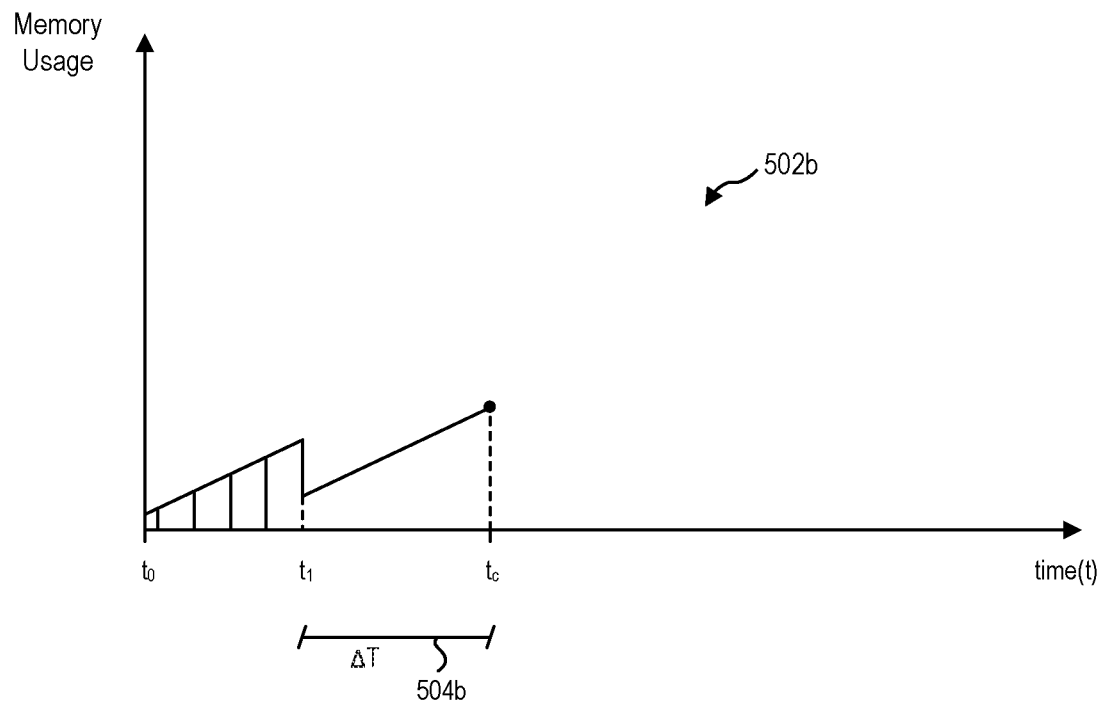

FIG. 5B illustrates a second timeline 502b showing an updated representation of the memory usage over time. In particular, the second timeline 502b shows that while the memory usage increased over time, there was a sharp decrease in memory usage after which the memory usage continued to increase between a first timestamp ($t_1$) and the updated current timestamp ($t_c$). Based on the observed decrease in memory usage followed by the trend of increased memory usage, the memory leak management system 106 can modify the current time interval (ΔT) 504b to extend between the first timestamp ($t_1$) and the updated current timestamp ($t_c$). In this example, the memory leak management system 106 can discard any memory usage data collected between the initial timestamp ($t_0$) and the first timestamp ($t_1$).

Figure 5C:
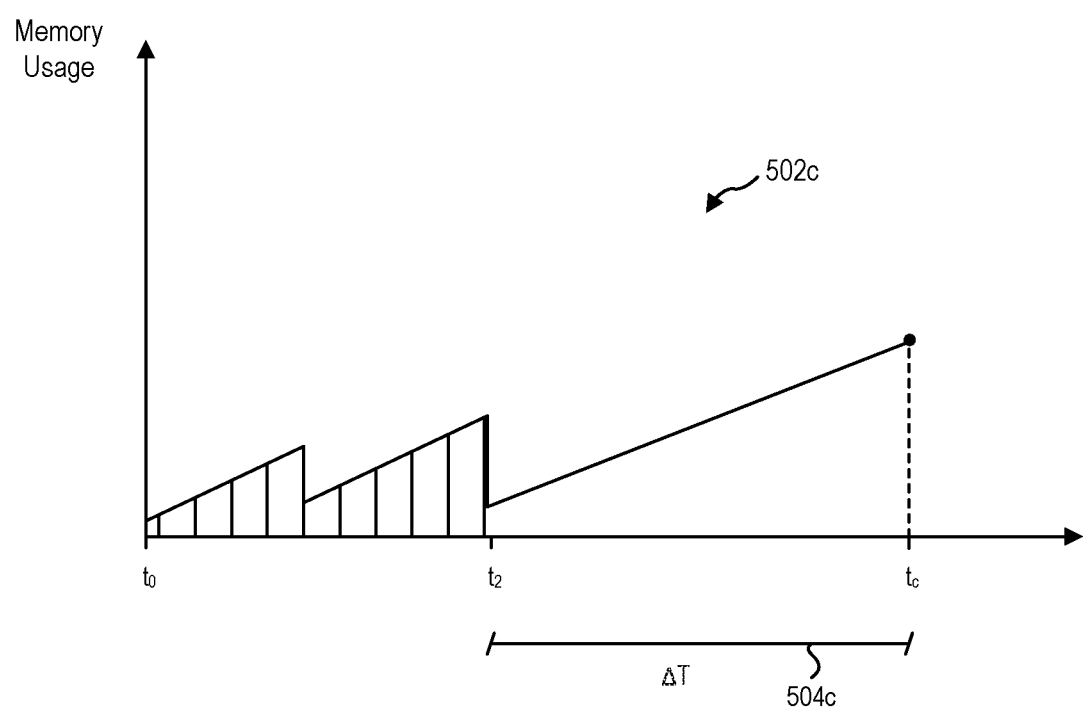

FIG. 5C illustrates a third timeline 502c showing another updated representation of the memory usage over time. In particular, the third timeline 502c shows another sharp decrease in memory usage after which the memory usage continues to increase between a second timestamp ($t_2$) and an updated current timestamp ($t_c$). Based on the observed pattern of memory usage and based on the memory usage data increasing over a threshold period of time, the memory leak management system 106 may update the current time interval (ΔT) 504c to extend between the second timestamp ($t_2$) and an updated current timestamp ($t_c$). In this example, the memory leak management system 106 may discard any memory usage data collected prior to the second timestamp ($t_2$), thus reducing processing expense on one or more server devices of the memory leak management system 106.

While FIGS. 5A-5C illustrate an example implementation in which the memory leak detection system 106 determines a relevant time interval based on an upward trend of memory usage for a predetermined period of time and/or based on a sharp increase in memory usage, other metrics may be considered in determining the time interval. For instance, the memory leak detection system 106 may determine a time interval having an initial timestamp based on data missing for a threshold period of time. As another example, the memory leak detection system 106 can determine a time interval based on an identified drop or jump in memory usage within a short period of time. Other conditions may include determining that a memory usage value has not changed an expected amount, determining that the memory usage value has dropped below a previous benchmark value, determining that memory usage has dropped below a starting value (e.g., where additional processes have been onboarded), determining that there has been no change for a threshold period of time, determining that the memory usage has not increased enough over a threshold period of time, or identifying other suspect conditions.

Figure 6:
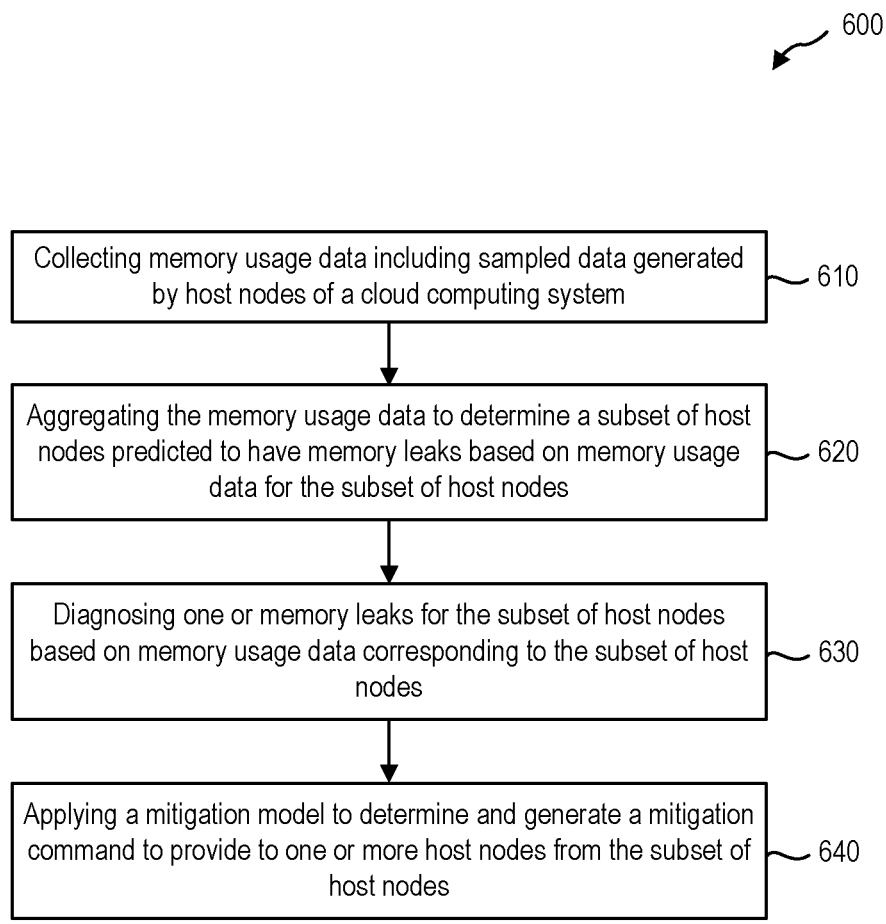
FIG. 6 illustrates an example series of acts for diagnosing and mitigating memory leaks on one or more host nodes of a cloud computing system.

Turning now to FIG. 6, this figure illustrates an example flowchart including a series of acts for diagnosing and mitigating memory leaks on host node(s) of a cloud computing system. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

As shown in FIG. 6, the series of act 600 includes an act 610 of collecting memory usage data including sampled data generated by host nodes of a cloud computing system. For example, in one or more implementations, the act 610 involves collecting memory usage data for a plurality of host nodes on a cloud computing system, the memory usage data including sampled data corresponding to one or more types of memory usage on the plurality of host nodes.

In one or more implementations, collecting memory usage data includes receiving, from each host node of the plurality of host nodes, locally generated memory usage data, the locally generated memory usage data comprising memory usage data sampled by one or more agents on each of the plurality of host nodes. The one or more agents may include a first agent and a second agent for collecting different types of memory usage data. The first agent may collect memory usage data for one or more application processes while the second agent collects memory usage data for an operating system and drivers.

As further shown, the series of acts 600 includes an act 620 of aggregating the memory usage data to determine a subset of host nodes predicted to have memory leaks based on memory usage data for the subset of host nodes. For example, in one or more implementations, the act 620 involves aggregating the memory usage data over one or more predetermined intervals to determine a subset of host nodes from the plurality of host nodes predicted to have memory leaks based on memory usage data for the subset of host nodes satisfying one or more impact metrics. The one or more impact metrics may include one or more of a threshold increase in memory usage over a relevant time interval, a threshold increase in memory usage over a short duration of time, a threshold decrease in memory usage over the relevant time interval, or a lack of change in memory usage over the relevant time interval.

In one or more embodiments, aggregating the memory usage data includes determining, for each host node, a relevant time interval. Determining the relevant time interval may include determining whether a trend of the memory usage data for a host node has increased over a threshold period of time. Determining the relevant time interval may also include iteratively modifying the time interval based on determining whether the trend of the memory usage data for the host node has increased over the threshold period of time. In one or more embodiments, aggregating the memory usage data further includes selectively identifying the portion of the aggregated memory usage data based on timestamps for the portion of the aggregated memory usage data corresponding to the modified time interval.

As further shown, the series of acts 600 includes an act 630 of diagnosing one or more memory leaks for the subset of host nodes based on memory usage data corresponding to the subset of host nodes. For example, in one or more implementations, the act 630 involves diagnosing one or more memory leaks for the subset of host nodes based on memory usage data corresponding to the subset of host nodes.

As further shown, the series of acts 600 includes an act 640 of applying a mitigation model to determine and generate a mitigation command to provide to one or more host nodes from the subset of host nodes. For example, in one or more implementations, the act 640 involves applying a mitigation model to the portion of the aggregated data to determine and generate a mitigation command to provide to one or more host nodes from the subset of host nodes.

In one or more embodiments, diagnosing the one or more memory leaks includes determining a severity of the one or more memory leaks. In addition, in one or more implementations, applying the mitigation model includes determining the mitigation action from a plurality of mitigation actions based on the severity of the one or more memory leaks.

In one or more embodiments, diagnosing the one or more memory leaks includes determining a type of the one or more memory leaks. In addition, in one or more embodiments, applying the mitigation model includes determining the mitigation action from the plurality of mitigation actions based on the determined type of the one or more memory leaks.

In one or more embodiments, diagnosing the one or more memory leaks comprises determining a type of the one or more memory leaks and a severity of the one or more memory leaks. In addition, in one or more embodiments, applying the mitigation model includes iterating through a mitigation tree including a plurality of mitigation commands to identify the mitigation command from the plurality of mitigation commands to provide to the one or more host nodes from the subset of host nodes.

The series of acts 600 may further include causing the plurality of host nodes to provide additional memory usage data to an analysis service, the analysis service including a third-party service on the cloud computing system or a different cloud computing system. The series of acts 600 may further include receiving, from the analysis service, information associated with specific host nodes and processes on which memory leaks have occurred. The series of acts 600 may include issuing a rollout stop signal causing a rollout of one or more applications on the cloud computing system to stop. In one or more embodiments, determining the subset of host nodes is further based on an identification of host nodes from the plurality of host nodes affected by the rollout of the one or more applications prior to issuing the rollout stop signal.

Figure 7:
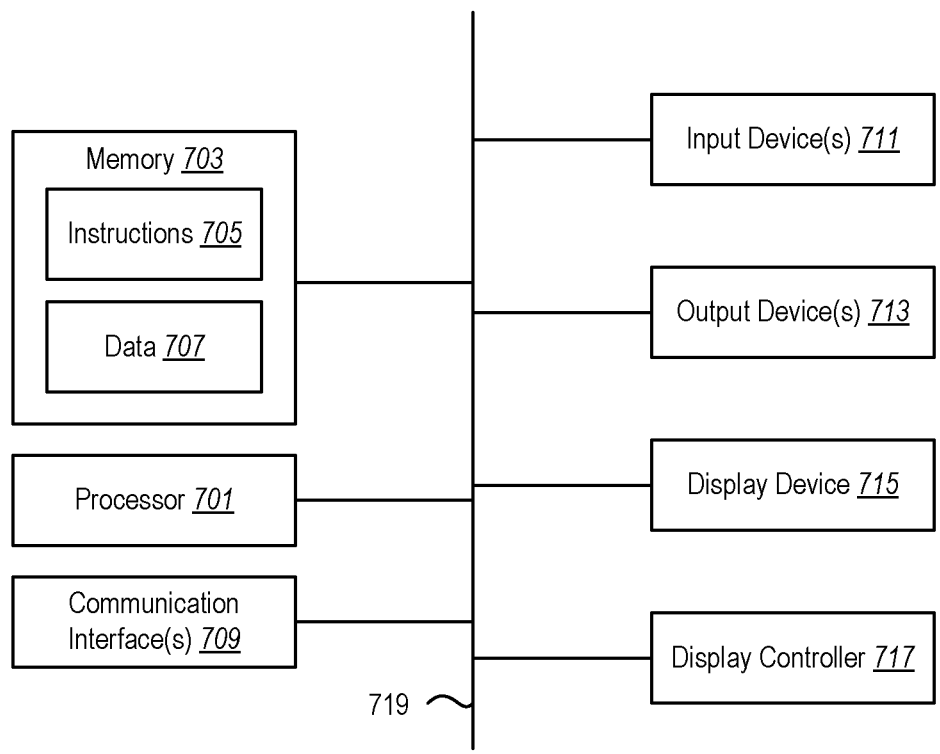
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD- ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   collecting memory usage data for a plurality of host nodes on a cloud computing system, the memory usage data including sampled data corresponding to one or more types of memory usage on the plurality of host nodes;
   aggregating the memory usage data over one or more relevant time intervals to determine a subset of host nodes from the plurality of host nodes predicted to have memory leaks based on memory usage data for the subset of host nodes satisfying one or more impact metrics, wherein determining the one or more relevant time intervals includes, for each host node:
      determining whether a trend of the memory usage data for a host node has increased over a threshold period of time; and
      iteratively modifying the time interval based on determining whether the trend of the memory usage data for the host node has increased over the threshold period of time;
   diagnosing one or more memory leaks for the subset of host nodes based on memory usage data corresponding to the subset of host nodes; and
   applying a mitigation model to a portion of the aggregated data to determine and generate a mitigation command to provide to one or more host nodes from the subset of host nodes.

2. The method of claim 1, wherein collecting memory usage data comprises receiving, from each host node of the plurality of host nodes, locally generated memory usage data, the locally generated memory usage data comprising memory usage data sampled by one or more agents on each of the plurality of host nodes.

3. The method of claim 2, wherein the one or more agents comprise a first agent and a second agent for collecting different types of memory usage data, wherein the first agent collects memory usage data for one or more application processes, and wherein the second agent collects memory usage data for an operating system and drivers.

4. The method of claim 1, wherein aggregating the memory usage data further comprises selectively identifying the portion of the aggregated memory usage data based on timestamps for the portion of the aggregated memory usage data corresponding to the modified time interval.

5. The method of claim 1, wherein the one or more impact metrics includes one or more of:
   a threshold increase in memory usage over a relevant time interval;
   a threshold increase in memory usage over a short duration of time;
   a threshold decrease in memory usage over the relevant time interval; or
   a lack of change in memory usage over the relevant time interval.

6. The method of claim 1, further comprising:
   causing the plurality of host nodes to provide additional memory usage data to an analysis service, the analysis service including a third-party service on the cloud computing system or a different cloud computing system; and
   receiving, from the analysis service, information associated with specific host nodes and processes on which memory leaks have occurred.

7. The method of claim 6, further comprising issuing a rollout stop signal causing a rollout of one or more applications on the cloud computing system to stop.

8. The method of claim 7, wherein determining the subset of host nodes is further based on an identification of host nodes from the plurality of host nodes affected by the rollout of the one or more applications prior to issuing the rollout stop signal.

9. The method of claim 1, wherein diagnosing the one or more memory leaks comprises determining a severity of the one or more memory leaks, and wherein applying the mitigation model comprises determining the mitigation action from a plurality of mitigation actions based on the severity of the one or more memory leaks.

10. The method of claim 1, wherein diagnosing the one or more memory leaks comprises determining a type of the one or more memory leaks, and wherein applying the mitigation model comprises determining the mitigation action from the plurality of mitigation actions based on the determined type of the one or more memory leaks.

11. The method of claim 1, wherein diagnosing the one or more memory leaks comprises determining a type of the one or more memory leaks and a severity of the one or more memory leaks, and wherein applying the mitigation model comprises iterating through a mitigation tree including a plurality of mitigation commands to identify the mitigation command from the plurality of mitigation commands to provide to the one or more host nodes from the subset of host nodes.

12. A system, comprising:
   one or more processors;
   memory in electronic communication with the one or more processors; and
   instructions stored in the memory, the instructions being executable by the one or more processors to:
      collect memory usage data for a plurality of host nodes on a cloud computing system, the memory usage data including sampled data corresponding to one or more types of memory usage on the plurality of host nodes;
      aggregate the memory usage data over one or more relevant time intervals to determine a subset of host nodes from the plurality of host nodes predicted to have memory leaks based on memory usage data for the subset of host nodes satisfying one or more impact metrics, wherein determining the one or more relevant time intervals includes, for each host node:
         determining whether a trend of the memory usage data for a host node has increased over a threshold period of time; and
         iteratively modifying the time interval based on determining whether the trend of the memory usage data for the host node has increased over the threshold period of time;
      diagnose one or more memory leaks for the subset of host nodes based on memory usage data corresponding to the subset of host nodes; and
      apply a mitigation model to a portion of the aggregated data to determine and generate a mitigation command to provide to one or more host nodes from the subset of host nodes.

13. The system of claim 12,
   wherein collecting memory usage data comprises receiving, from each host node of the plurality of host nodes, locally generated memory usage data, the locally generated memory usage data comprising memory usage data sampled by one or more agents on each of the plurality of host nodes, and
   wherein the one or more agents comprise a first agent and a second agent for collecting different types of memory usage data, wherein the first agent collects memory usage data for one or more application processes, and wherein the second agent collects memory usage data for an operating system and drivers.

14. The system of claim 12, further comprising instructions being executable by the one or more processors to:
   cause the plurality of host nodes to provide additional memory usage data to an analysis service, the analysis service including a third-party service on the cloud computing system or a different cloud computing system;
   receive, from the analysis service, information associated with specific host nodes and processes on which memory leaks have occurred; and
   issue a rollout stop signal causing a rollout of one or more applications on the cloud computing system to stop, wherein determining the subset of host nodes is further based on an identification of host nodes from the plurality of host nodes affected by the rollout of the one or more applications prior to issuing the rollout stop signal.

15. A non-transitory computer readable medium storing instructions thereon that, when executed by one or more processors, causes one or more server devices to:
   collect memory usage data for a plurality of host nodes on a cloud computing system, the memory usage data including sampled data corresponding to one or more types of memory usage on the plurality of host nodes;
   aggregate the memory usage data over one or more relevant time intervals to determine a subset of host nodes from the plurality of host nodes predicted to have memory leaks based on memory usage data for the subset of host nodes satisfying one or more impact metrics, wherein determining the one or more relevant time intervals includes, for each host node:
      determining whether a trend of the memory usage data for a host node has increased over a threshold period of time; and
      iteratively modifying the time interval based on determining whether the trend of the memory usage data for the host node has increased over the threshold period of time;
   diagnose one or more memory leaks for the subset of host nodes based on memory usage data corresponding to the subset of host nodes; and
   apply a mitigation model to a portion of the aggregated data to determine and generate a mitigation command to provide to one or more host nodes from the subset of host nodes.

16. The non-transitory computer readable medium of claim 15,
   wherein collecting memory usage data comprises receiving, from each host node of the plurality of host nodes, locally generated memory usage data, the locally generated memory usage data comprising memory usage data sampled by one or more agents on each of the plurality of host nodes, and
   wherein the one or more agents comprise a first agent and a second agent for collecting different types of memory usage data, wherein the first agent collects memory usage data for one or more application processes, and wherein the second agent collects memory usage data for an operating system and drivers.

17. The non-transitory computer readable medium of claim 15, further comprising instructions that, when executed by the one or more processors, causes one or more server devices to:
   cause the plurality of host nodes to provide additional memory usage data to an analysis service, the analysis service including a third-party service on the cloud computing system or a different cloud computing system;
   receive, from the analysis service, information associated with specific host nodes and processes on which memory leaks have occurred; and
   issue a rollout stop signal causing a rollout of one or more applications on the cloud computing system to stop, wherein determining the subset of host nodes is further based on an identification of host nodes from the plurality of host nodes affected by the rollout of the one or more applications prior to issuing the rollout stop signal.

* * * * *